(12) United States Patent
Carawan et al.

(10) Patent No.: US 6,258,143 B1
(45) Date of Patent: Jul. 10, 2001

(54) FLUID FILTER WITH BAFFLE

(75) Inventors: Paul Jennings Carawan, Gastonia; Bruce Edward Coffey, Charlotte, both of NC (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/353,627

(22) Filed: Jul. 15, 1999

(51) Int. Cl.$^7$ .................................................. B01D 46/00
(52) U.S. Cl. .......................... 55/385.3; 55/465; 55/499; 55/501; 55/502
(58) Field of Search ............................ 55/320, 385.3, 55/465, 499, 501, 502

(56) References Cited

U.S. PATENT DOCUMENTS

| | | | |
|---|---|---|---|
| 2,731,104 | 1/1956 | Baker et al. | 183/44 |
| 3,727,769 | 4/1973 | Scholl | 210/484 |
| 3,938,973 | 2/1976 | Kershaw | 55/501 |
| 4,317,663 | 3/1982 | Dollar | 55/413 |
| 4,547,950 | * 10/1985 | Thompson | 55/499 |
| 4,725,296 | 2/1988 | Kurotobi | 55/497 |
| 5,618,324 | * 4/1997 | Sommer et al. | 55/497 |
| 5,683,479 | * 11/1997 | Gillingham et al. | 55/431 |
| 5,782,944 | 7/1998 | Justice | 55/495 |
| 5,795,361 | * 8/1998 | Lanier et al. | 55/502 |
| 5,814,219 | * 9/1998 | Friedmann et al. | 210/493.3 |
| 5,853,577 | 12/1998 | Gizowski et al. | 210/168 |
| 6,039,779 | * 3/2000 | Butz et al. | 55/499 |

* cited by examiner

*Primary Examiner*—Peter A. Hruskoci
(74) *Attorney, Agent, or Firm*—Millen, White, Zelano & Branigan, P.C.

(57) ABSTRACT

The capacity and efficiency of a filter element having pleated filter media is increased by utilizing a baffle across the upstream front area of the filter media. The baffle is preferably a web of material that is adhered to the peaks of the filter media. Preferably, the baffle is laterally offset and has a width which is in the range of 20–75% of the width of the filter media. Utilizing the baffle does not increase restriction to an unacceptable range.

22 Claims, 2 Drawing Sheets

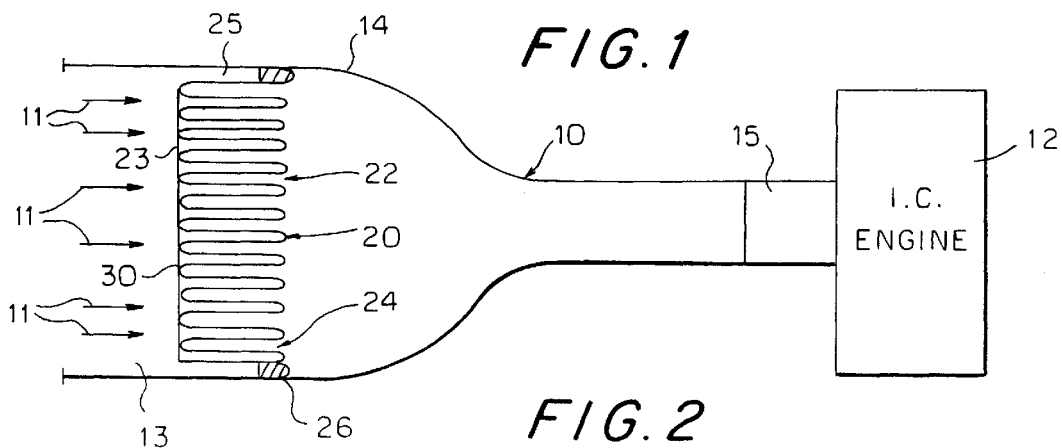
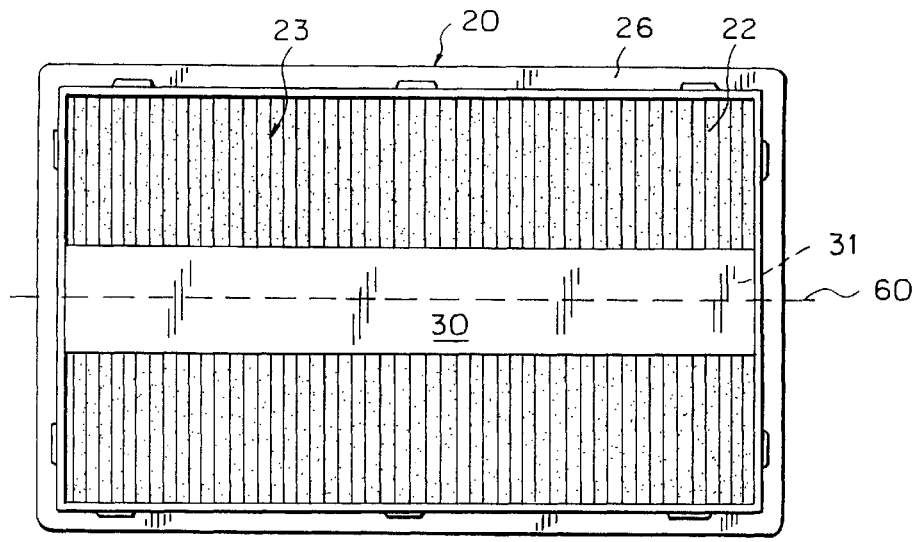
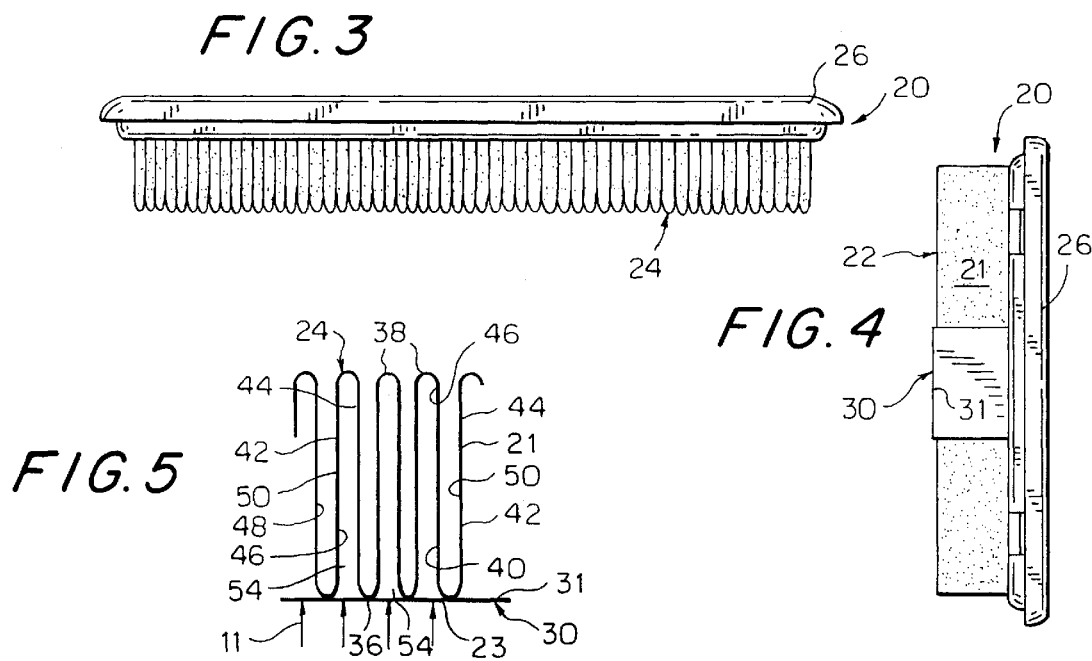

FLUID FILTER WITH BAFFLE

FIELD OF THE INVENTION

The present invention is directed to fluid filters with baffles and more particularly, the present invention is directed to fluid filters with baffles which are useful in filtering air for internal combustion engines.

BACKGROUND OF THE INVENTION

Tens of millions of air filters are manufactured every year for use with internal combustion engines. Internal combustion engines used to power vehicles necessarily consume dust-laden air during their operation. The dust must be removed from the air in order to have acceptable engine life. Over time, the air filters become clogged with dust and are periodically replaced. As a filter becomes clogged, it causes an increase in fuel consumption and a decrease in engine power which combine to increase air pollution.

Air filters used with internal combustion engines tend not to have an even distribution of dust and debris over their surfaces which tends to decrease their efficiency and reduce their capacity. Overall filter performance is a combination of efficiency capacity and restriction. It has been found that as capacity and efficiency are increased restriction also increases, which has deleterious effects on engine performance. Consequently, increasing efficiency and capacity in current filters does not necessarily result in an advantage because if restriction is unacceptably increased, then power decreases and fuel consumption increases with the invariable result that air pollution increases. The increase in air pollution from a single vehicle is not significant; however, slight increases in air pollution from an entire fleet of vehicles, such as the vehicles operating in an urban area combine to create an environmental hazard.

By increasing capacity while increasing or at least not reducing efficiency and by maintaining acceptable restriction, the filter life is extended so that when air filters are periodically changed in accordance with a maintenance schedule, they are changed before restriction becomes unacceptable. Moreover, since filters last longer, there is ultimately less waste to dispose of, which in itself reduces environmental impact as well as irritation to businesses and people who service vehicles.

While improving efficiency and capacity of air filters used for internal combustion engines is a major concern addressed by the present invention, it is to be understood that increasing efficiency and capacity without unacceptably increasing restriction is also desirable in other types of filters, such as air and gas filters used in air conditioning systems and industrial plants, and in filters such as panel-type filters used to filter liquids.

SUMMARY OF THE INVENTION

In view of the aforementioned considerations, it is a feature of the present invention to provide new and improved filters with substantial increases in capacity and possible increases in efficiency, without deleterious increases in restriction.

In accordance with the present invention, a filter element for filtering a stream of fluid comprises a pleated filter media and a baffle. The pleated filter media has a first area facing the stream of fluid and a rear area facing away from the stream of fluid. The filter media includes an array of pleats defined by peaks and valleys with the peaks being on an upstream side of the filter media to define a front area. The peaks are separated by gaps which extend to the valleys to define pairs of opposed panels having upstream faces and downstream faces. The baffle extends across the peaks and spans the gaps for deflecting the stream of fluid impacting the front area. This increases capacity without significant increase in restriction and without a reduction in efficiency.

In accordance with a more specific aspect of the invention, the combination of the filter and baffle is used to filter air, and in a still more specific aspect of the invention, the filter element is mounted in a housing used to supply air to an internal combustion engine.

In accordance with a further aspect of the invention, the baffle is in the form of a web, which extends across the peaks of the filter media and is in contact with the peaks, covering from about 20% to about 75% of the front area of the filter media.

BRIEF DESCRIPTION OF THE DRAWINGS

FIG. 1 is a schematic illustration showing the baffled filter element of the present invention installed in a housing of an air intake of an internal combustion engine;

FIG. 2 is a front area view of the upstream side of a first embodiment of an air filter in accordance with the present invention;

FIG. 3 is a side view of the filter element of FIG. 2;

FIG. 4 is an end view of the filter element of FIGS. 2 and 3;

FIG. 5 is an enlarged side view of a portion of a filter media and baffle of the filter element of FIGS. 1–4;

DETAILED DESCRIPTION

Figure 6:
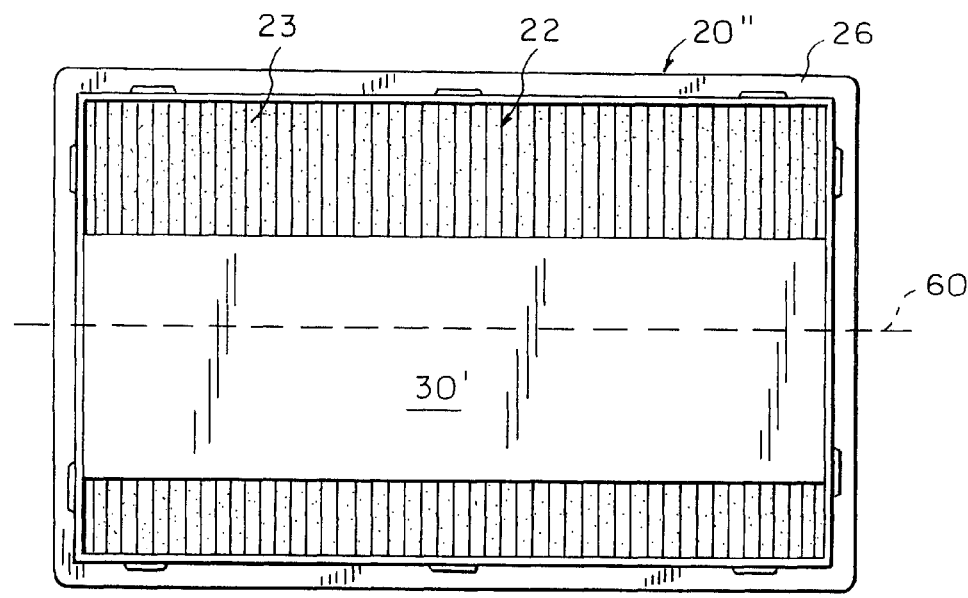
FIG. 6 is a view of the front area of a second embodiment of a filter element in accordance with the present invention.

Referring now to FIG. 1, there is shown schematically, a system 10 for supplying a stream of combustion air 11 to an internal combustion engine 12. The system includes an inlet 13, a housing 14 and a connection 15 to the engine 12. Disposed within the housing 14 is a filter element 20, configured in accordance with the principles of the present invention. The filter element 20 includes a pleated filter media 22 which has a upstream area 23 and a downstream area 24. Disposed around the periphery 25 of the filter media 22 is a peripheral gasket 26 that seals with the inside wall surface of the housing 14.

Referring now to FIGS. 2–5 where a first embodiment of the filter element 20 is shown in detail, it is seen that the filter element includes a baffle 30 which extends across front area of the pleated filter media 22. The baffle 30 deflects the airstream 11 so as to create a negative pressure on the downstream side 31 of the baffle which helps suspend particles of dust within the airstream 11 which in turn changes the face velocity of air striking the upstream surfaces of the pleated filter media 22. By suspending particles using negative pressure, the performance of the filter element 20 is improved because its capacity and efficiency are increased without unduly increasing restriction.

As is seen in FIG. 5, the pleated filter media 21 has upstream peaks 36 and downstream valleys 38 which are joined by opposed panels 40 and 42. The panels 40 and 42 have upstream faces 44 and 46 and downstream faces 48 and 50. Between the upstream faces 44 and 46 of the panels 40 and 42 are gaps 54. The gaps 54 create the negative pressure behind the baffle 30 that draws particulate matter into the area of the filter media 22 covered by the baffle 30. Consequently, the dust and debris comprising particulate matter is distributed more evenly over the entire surfaces defined by the upstream faces 44 and 46 of the panels 40 and 42, respectively.

Figure 7:
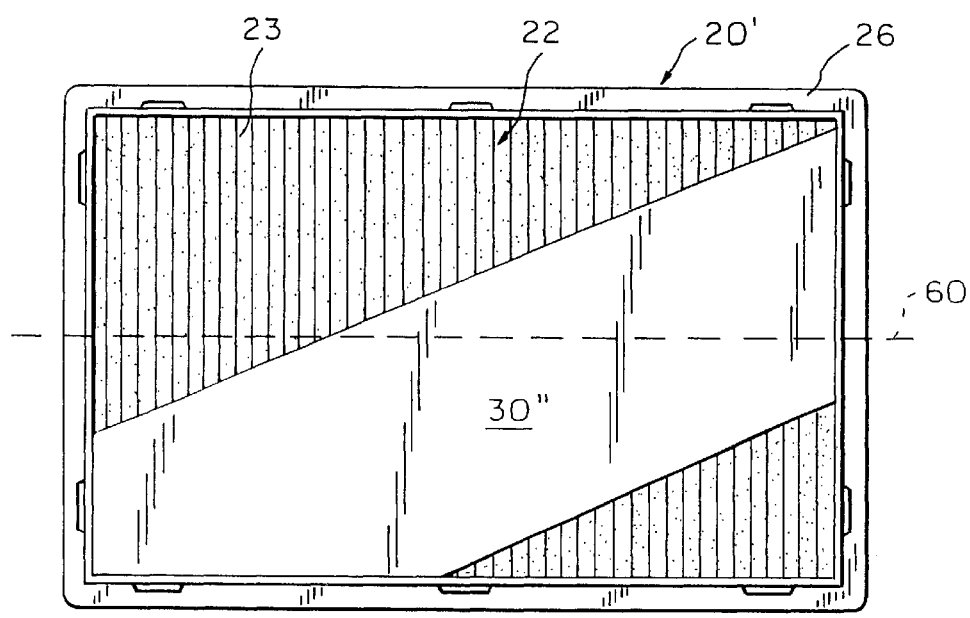
FIG. 7 is a view of the front area of a third embodiment of a filter element in accordance with the present invention.

In the embodiment of FIG. 2, the baffle 30 is centered and has a width of about 23% of the width of the filter media 21. As is seen in FIGS. 6 and 7, the baffle 30 may have a width of about 23% of the width of the filter media 21. Moreover, the baffle 30 may work better if not centered on the filter media 21 so that it is closer to one side of the filter media than the other.

Referring now to FIG. 6, there is shown a filter element 20' with a baffle 30' which is substantially wider than the baffle 30 of FIG. 2 and is laterally shifted so that there is more baffle area on one side of the longitudinal axis 60 of the filter media 21 than the other. In tests, it was found that the embodiment of FIG. 6 resulted in a larger filter capacity than the arrangement of FIG. 2.

In FIG. 7, there is shown a filter element 20" with a baffle 30" extending diagonally across the front area 23 of the filter media 22. The embodiment of FIG. 7 utilizing the diagonally extending baffle 30" is indicative of various sizes and shapes that baffles according to the present invention may assume.

It has been determined that the baffle arrangement works best if the baffle is tightly secured against the peaks 36 of the filter media 21, such as bonding therewith by adhesive. Initially, it has been found that a preferable material for the baffles 30–30" is the same material which comprises the filter media. For example, if the filter media is a paper filter media, then the baffles 30–30" are also made of paper.

EXAMPLES

Tests were conducted using Type A and Type B filter media with the filter media varying in the number of pleats from 69 pleats to 88 pleats. The composite result of the tests was a one percent increase in efficiency and a 19% increase in capacity without a detrimental increase in restriction. For example, it was found that making an original equipment filter better caused a 25% increase in restriction, while utilizing a baffle on the same filter caused only a 30% increase in restriction as well as increased performance as measured by the efficiency and capacity of the filter. Consequently, the baffles 30–30" can be used to increase the performance of borderline filters and used to eliminate pleats from existing filters. Moreover, for after-market and second-line filters, less expensive filter media 21 may be used by employing baffles such as the baffles 30–30".

From the foregoing description, one skilled in the art can easily ascertain the essential characteristics of this invention, and without departing from the spirit and scope thereof, can make various changes and modification of the invention to adapt it to various usages and conditions.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

We claim:

1. A filter element for filtering a stream of fluid containing particlesd, the filter element comprising:

a front area facing the stream of fluid for direct impact of the stream of fluid and a rear area facing away from the stream of fluid, the filter media comprising an array of pleats defined by peaks and valleys with the peaks being on an upstream side of the filter media to define the front area, the peaks being separated by gaps which extend to the valleys to define pairs of opposed panels having upstream faces and downstream faces; and baffling extending across the peaks and spanning the gaps for deflecting a portion of the stream of fluid impacting the peaks and upstream faces of the opposed panels, said baffling arranged to create a negative pressure on a downstream side of the baffling to help suspend said particles, and to increase filter performance by increasing capacity without significant reduction in restriction.

2. The filter element of claim 1 wherein the filter media has a rectangular periphery and wherein the baffling is provided by an elongated baffle and extends across the filter media.

3. The filter element of claim 2 wherein the baffle is rectangular and extends over the filter media from a first side to a second side thereof.

4. The filter element of claim 3 wherein the baffle is adhered to the peaks.

5. The filter element of claim 4 wherein the baffle is a web.

6. The filter element of claim 5 wherein the web comprising the baffle is a strip of filter media material.

7. The filter element of claim 5 wherein the fluid is a gas.

8. The filter element of claim 7 wherein the gas is air.

9. The filter element of claim 1 wherein the fluid is air and wherein the baffling is a web of material.

10. The filter element of claim 9 wherein the baffling covers from about 20 to about 75 percent of the front area of the filter media.

11. The filter element of claim 10 wherein the baffling covers about 30% of the front area.

12. The filter element of claim 10 wherein the baffling covers about 50% of the front area.

13. The filter element of claim 10 wherein a sealing gasket for sealing with a filter housing is disposed adjacent and around the area of the filter media.

14. The filter element of claim 10 wherein the baffling is positioned off-center on the filter media.

15. The filter element of claim 14 wherein the filter media is rectangular and the baffling extends perpendicular to the extent of the individual pleats.

16. The filter element of claim 14 wherein the baffling extends obliquely with respect to the extent of the individual pleats.

17. The filter element of claim 1 wherein the baffling extends across only a portion of the front area and wherein there are substantial portions of the front area exposed directly to the stream of fluid.

18. An air filter element for filtering combustion air containing particles for an internal combustion engine wherein the filter is adapted to seat in a housing in the air inlet for the engine, the filter element comprising:

a front area facing the stream of combustion air and a rear area facing away from the stream of combustion air, the filter media comprising an array of pleats defined by peaks and valleys with the peaks being on an upstream side of the filter media to define the front area, the peaks being separated by gaps which extend to the valleys to define pairs of opposed panels having upstream faces and downstream faces; and baffling extending across the peaks and spanning the gaps for deflecting a portion of the stream of combustion air impacting the peaks and upstream faces of the opposed panels, said baffling arranged to create a negative pressure on a downstream side of the baffling to help suspend said particles, and to increase filter performance by increasing capacity without significant reduction in restriction.

19. The filter element of claim 1 wherein the filter media has a rectangular periphery and wherein the baffling is provided by an elongated baffle and extends across the filter media.

20. The filter element of claim 19 wherein the baffle is rectangular and extends over the filter media from a first side to a second side thereof.

21. The filter element of claim 20 wherein the baffling is a web which is adhered to the peaks.

22. The filter element of claim 18 wherein the baffling extends across only a portion of the front area and wherein there are substantial portions of the front area exposed directly to the stream of combination air.

* * * * *